US008243549B2

(12) United States Patent
Sayers

(10) Patent No.: US 8,243,549 B2
(45) Date of Patent: Aug. 14, 2012

(54) ESTIMATING SEISMIC ANISOTROPY OF SHALES

(75) Inventor: Colin Michael Sayers, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 391 days.

(21) Appl. No.: 12/372,129

(22) Filed: Feb. 17, 2009

(65) Prior Publication Data

US 2009/0225628 A1     Sep. 10, 2009

Related U.S. Application Data

(60) Provisional application No. 61/035,301, filed on Mar. 10, 2008.

(51) Int. Cl.
     *G01V 1/30*         (2006.01)
(52) U.S. Cl. ............. 367/73; 367/25; 702/11; 702/14
(58) Field of Classification Search ............ 367/25, 367/57, 73; 702/11, 14
See application file for complete search history.

(56) References Cited

U.S. PATENT DOCUMENTS

| | | | |
|---|---|---|---|
| 6,714,480 B2 * | 3/2004 | Sinha et al. ............ 367/31 |
| 6,901,333 B2 * | 5/2005 | Van Riel et al. ......... 702/18 |
| 2010/0312534 A1 * | 12/2010 | Xu et al. .................. 703/2 |

OTHER PUBLICATIONS

Sayers, C. M., Seismic anisotropy of shales, Geophysical Prospecting, 2005, pp. 667-676 (10 pages).
Sayers, C. M., Stress-dependent seismic anisotropy of shales, Geophysics, 1999, pp. 93-98 (6 pages).
Sayers, C. M. and Kachanov, M., Microcrack-induced elastic wave anisotropy of brittle rocks, Journal of Geophysical Research, Mar. 10, 1995, pp. 4149-4156 (8 pages).
Wang, Z., Wang, H., and Cates M. E., Effective elastic properties of solid clays, Geophysics, Mar.-Apr. 2001, pp. 428-440 (13 pages).

(Continued)

*Primary Examiner* — Ian Lobo
(74) *Attorney, Agent, or Firm* — Colin Wier

(57) ABSTRACT

In general, in one aspect, the invention relates to a method for determining properties of a subterranean formation. The method includes obtaining a micro-mechanical model for modeling the subterranean formation as a plurality of particles having low aspect ratio pores therebetween, wherein anisotropy of the subterranean formation is represented by normal compliance and shear compliance that describe deformation of the low aspect ratio pores under an applied stress, determining a ratio of normal compliance over shear compliance of the subterranean formation to obtain an estimated ratio of normal compliance over shear compliance, measuring a first formation parameter of the subterranean formation to obtain a measured first formation parameter based on a sonic measurement technique, determining a second formation parameter based on the micro-mechanical model using the estimated ratio of normal compliance over shear compliance and the measured first formation parameter, storing the second formation parameter of the subterranean formation, wherein the first formation parameter and the second formation parameter comprises at least one selected from a group consisting of an anisotropy parameter and a stiffness coefficient of the subterranean formation.

20 Claims, 6 Drawing Sheets

OTHER PUBLICATIONS

Jones, L. E. A. and Wang, H. F., Ultrasonic velocities in Cretaceous shales from the Williston basin, Geophysics, Mar. 1981, pp. 288-297 (10 pages).

Vernik, L. and Nur, A., Ultrasonic velocity and anisotropy of hydrocarbon source rocks, Geophysics, May 1992, pp. 727-735 (9 pages).

Hornby, B. E., Schwartz, L. M., and Hudson, J. A., Anisotropic effective-medium modeling of the elastic properties of shales, Geophysics, Oct. 1994, pp. 1570-1583 (14 pages).

Wang, Z., Seismic anisotropy in sedimentary rocks, part 2: Laboratory data, Geophysics, Sep.-Oct. 2002, pp. 1423-1440 (18 pages).

Johnston, J. E. and Chirstensen, N. I., Seismic anisotropy of shales, Journal of Geophysical Research, Apr. 10, 1995, pp. 5991-6003 (13 pages).

Sayers, C. M., The elastic anisotrophy of shales, Journal of Geophysical Research, Jan. 10, 1994, pp. 767-774 (8pages).

* cited by examiner

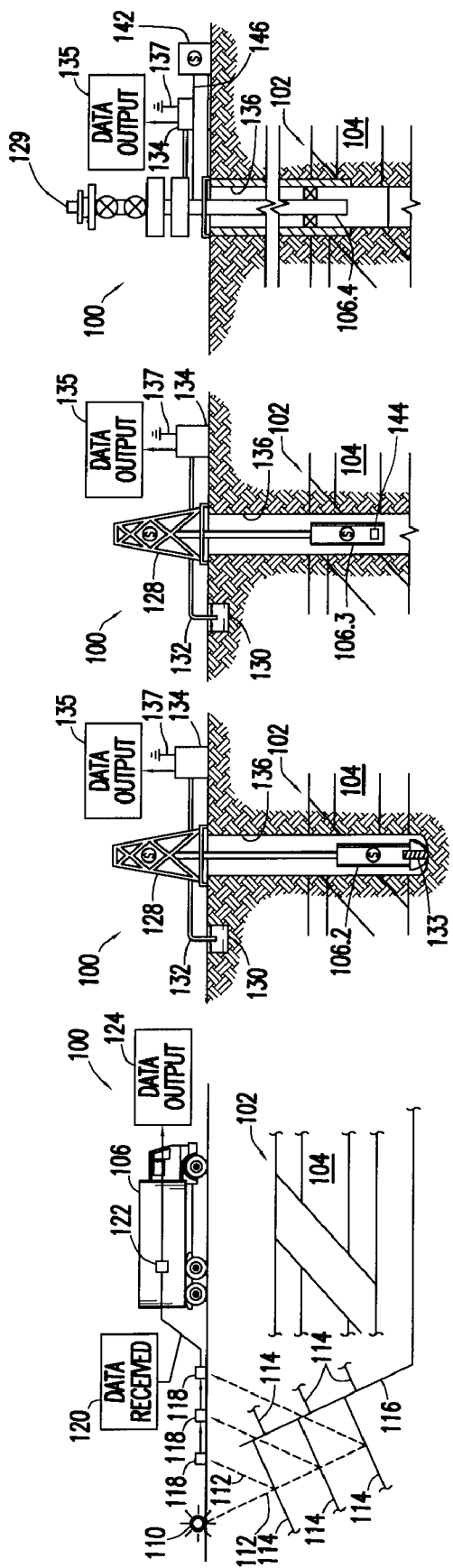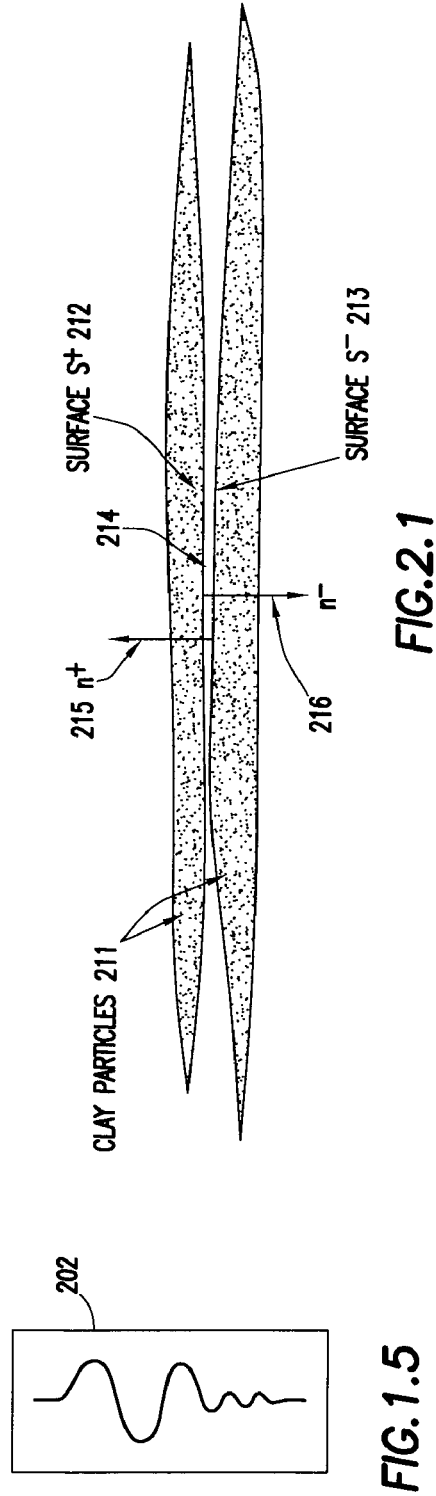

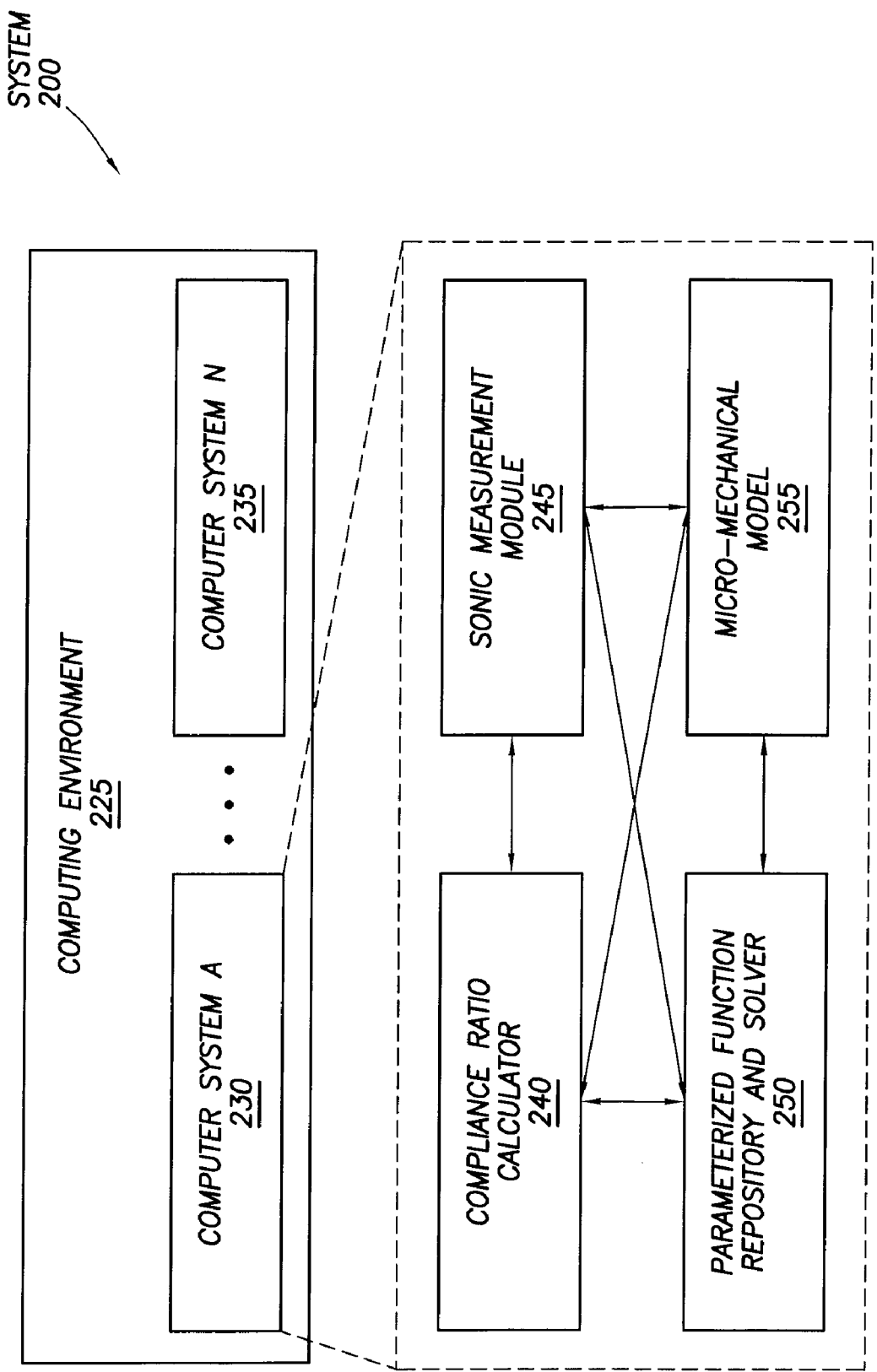
FIG.2.2

ESTIMATING SEISMIC ANISOTROPY OF SHALES

CROSS REFERENCE TO RELATED APPLICATIONS

This application claims priority under 35 U.S.C. §119(e) from Provisional Patent Application No. 61/035,301 filed Mar. 10, 2008, entitled "Method and Apparatus for Estimating Seismic Anisotropy Of Shales", which is hereby incorporated by reference in its entirety.

BACKGROUND

Isotropic earth models have been in standard use in the oilfield industry for many years; not because isotropy is a good assumption, but because anisotropic measurements have not been available. There are three basic types of formations: formations with identical elastic properties in all three spatial directions are called isotropic, formations with identical elastic properties in a plane (often the bedding plane) but a different property in the direction normal to the plane of symmetry are called transversely isotropic (TI), and formations with different properties in all three dimensions are called orthotropic (also known as orthorhombic). Two independent moduli (or stiffness coefficients in the stiffness matrix characterizing the formation) are used to characterize isotropic formations, five independent moduli are used to characterize TI formations, and nine independent moduli are used to characterize orthotropic formations.

Much of the motivation to determine the TI moduli focuses on determining a better stress profile to be used in geomechanics for drilling and completion solutions in gas shales, which have been made productive in recent years based on methods such as hydraulic fracturing. Shales are a major component of sedimentary basins, and they play a decisive role in fluid flow and seismic propagation because of their low permeability and anisotropic micro-structure. Shale anisotropy needs to be quantified to obtain reliable information on reservoir fluid, lithology, and pore pressure from seismic data, and to understand time-depth conversion errors and non-hyperbolic move-out.

SUMMARY

In general, in one aspect, the invention relates to a method for determining properties of a subterranean formation. The method includes obtaining a micro-mechanical model for modeling the subterranean formation as a plurality of particles having low aspect ratio pores therebetween, wherein anisotropy of the subterranean formation is represented by normal compliance and shear compliance that describe deformation of the low aspect ratio pores under an applied stress, determining a ratio of normal compliance over shear compliance of the subterranean formation to obtain an estimated ratio of normal compliance over shear compliance, measuring a first formation parameter of the subterranean formation to obtain a measured first formation parameter based on a sonic measurement technique, determining a second formation parameter based on the micro-mechanical model using the estimated ratio of normal compliance over shear compliance and the measured first formation parameter, storing the second formation parameter of the subterranean formation, wherein the first formation parameter and the second formation parameter comprises at least one selected from a group consisting of an anisotropy parameter and a stiffness coefficient of the subterranean formation.

Other aspects of this invention will be apparent from the following description and the appended claims.

BRIEF DESCRIPTION OF DRAWINGS

FIGS. 1.1-1.4 depict schematic block diagrams of a system in which embodiments of estimating seismic anisotropy of shales can be implemented.

FIG. 1.5 depicts a seismic trace of the subterranean formation of FIGS. 1.1-1.4.

FIG. 2.1 depicts an aspect of a micro-mechanical model of shales in accordance with one or more embodiments.

FIG. 2.2 depicts a system in accordance with one or more embodiments.

DETAILED DESCRIPTION

Figure 3:
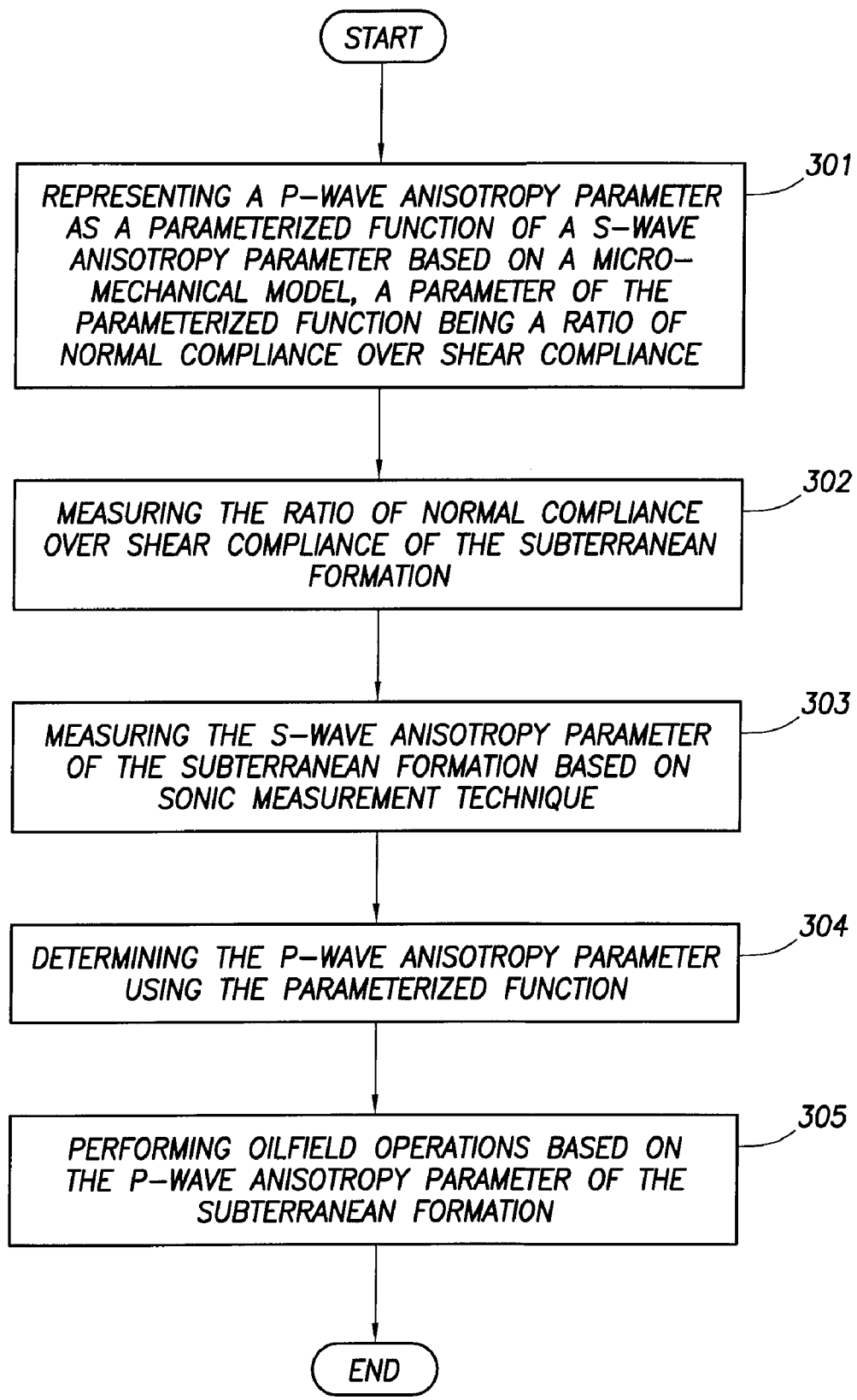
FIG. 3 is a flowchart depicting a method in accordance with one or more embodiments.

Specific embodiments of estimating seismic anisotropy of shales will now be described in detail with reference to the accompanying figures. Like elements in the various figures are denoted by like reference numerals for consistency.

In the following detailed description of embodiments of estimating seismic anisotropy of shales, numerous specific details are set forth in order to provide a more thorough understanding of estimating seismic anisotropy of shales. In other instances, well-known features have not been described in detail to avoid obscuring estimating seismic anisotropy of shales.

In general, estimating seismic anisotropy of shales relates generally to a method for determining elastic stiffness coefficients and elastic anisotropy using sonic logging techniques. The method may further include a micro-mechanical model describing the deformation under applied stress to the interparticle regions having low aspect ratio pores between clay particles, which is used to determine the character of the anisotropy of shales represented by normal compliance $B_N$ and shear compliance $B_T$.

FIGS. 1.1-1.4 depict simplified, representative, schematic views of a field (e.g., an oilfield) (100) having subterranean formation (102) containing reservoir (104) therein and depicting various oilfield operations being performed on the field (e.g., an oilfield) (100). FIG. 1.1 depicts a survey operation being performed by a survey tool, such as seismic truck (106.1) to measure properties of the subterranean formation. The survey operation is a seismic survey operation for producing sound vibrations (112). In FIG. 1.1, one such sound vibration (112) generated by a source (110) and reflects off a plurality of horizons (114) in an earth formation (116). The sound vibration(s) (112) is (are) received in by sensors (S), such as geophone-receivers (118), situated on the earth's surface, and the geophone-receivers (118) produce electrical output signals, referred to as data received (120) in FIG. 1.

In response to the received sound vibration(s) (112) representative of different parameters (such as amplitude and/or frequency) of the sound vibration(s) (112), the geophones (118) produce electrical output signals containing data concerning the subterranean formation. The data received (120) is provided as input data to a computer (122.1) of the seismic truck (106.1), and responsive to the input data, the computer (122.1) generates a seismic data output record (124). The seismic data may be stored, transmitted, or further processed as desired, for example by data reduction.

FIG. 1.2 depicts a drilling operation being performed by a drilling tools (106b) suspended by a rig (128) and advanced into the subterranean formations (102) to form a wellbore (136). A mud pit (130) is used to draw drilling mud into the drilling tools (106b) via flow line (132) for circulating drilling mud through the drilling tools (106b), up the wellbore and back to the surface. The drilling tools (106b) are advanced into the subterranean formations to reach reservoir (104). Each well may target one or more reservoirs. The drilling tools (106b) may be adapted for measuring downhole properties using logging while drilling tools. The logging while drilling tool (106b) may also be adapted for taking a core sample (133) as depicted, or removed so that a core sample (133) may be taken using another tool.

A surface unit (134) is used to communicate with the drilling tools (106b) and/or offsite operations. The surface unit (134) is capable of communicating with the drilling tools (106b) to send commands to the drilling tools, and to receive data therefrom. The surface unit (134) may be provided with computer facilities for receiving, storing, processing, and/or analyzing data from the field (e.g., an oilfield) (100). The surface unit (134) collects data generated during the drilling operation and produces data output (135) which may be stored or transmitted. Computer facilities, such as those of the surface unit (134), may be positioned at various locations about the field (e.g., an oilfield) (100) and/or at remote locations.

Sensors (S), such as gauges, may be positioned about the oilfield to collect data relating to various oilfields operations as described previously. As depicted, the sensor (S) is positioned in one or more locations in the drilling tools and/or at the rig to measure drilling parameters, such as weight on bit, torque on bit, pressures, temperatures, flow rates, compositions, rotary speed, and/or other parameters of the oilfield operation. Sensors may also be positioned in one or more locations in the circulating system.

The data gathered by the sensors (S) may be collected by the surface unit (134) and/or other data collection sources for analysis or other processing. The data collected by the sensors (S) may be used alone or in combination with other data. The data may be collected in one or more databases and/or all or transmitted on or offsite. All or select portions of the data may be selectively used for analyzing and/or predicting oilfield operations of the current and/or other wellbores. The data may be may be historical data, real time data, or combinations thereof. The real time data may be used in real time, or stored for later use. The data may also be combined with historical data or other inputs for further analysis. The data may be stored in separate databases, or combined into a single database.

Data outputs from the various sensors (S) positioned about the oilfield may be processed for use. The data may be historical data, real time data, or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical, and/or reservoir engineering. The reservoir, wellbore, surface and/or process data may be used to perform reservoir, wellbore, geological, and geophysical or other simulations. The data outputs from the oilfield operation may be generated directly from the sensors (S), or after some preprocessing or modeling. These data outputs may act as inputs for further analysis.

The data is collected and stored at the surface unit (134). One or more surface units (134) may be located at the field (e.g., an oilfield) (100), or connected remotely thereto. The surface unit (134) may be a single unit, or a complex network of units used to perform the necessary data management functions throughout the field (e.g., an oilfield) (100). The surface unit (134) may be a manual or automatic system. The surface unit (134) may be operated and/or adjusted by a user.

The surface unit (134) may be provided with a transceiver (137) to allow communications between the surface unit (134) and various portions of the field (e.g., an oilfield) (100) or other locations. The surface unit (134) may also be provided with or functionally connected to one or more controllers for actuating mechanisms at the field (e.g., an oilfield) (100). The surface unit (134) may then send command signals to the field (e.g., an oilfield) (100) in response to data received. The surface unit (134) may receive commands via the transceiver or may itself execute commands to the controller. A processor may be provided to analyze the data (locally or remotely) and make the decisions and/or actuate the controller. In this manner, the field (e.g., an oilfield) (100) may be selectively adjusted based on the data collected. This technique may be used to optimize portions of the oilfield operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 depicts a wireline operation being performed by a wireline tool (106c) suspended by the rig (128) and into the wellbore (136) of FIG. 1.2. The wireline tool (106c) may be adapted for deployment into a wellbore (136) for generating well logs, performing downhole tests and/or collecting samples. The wireline tool (106c) may be used to provide another method and apparatus for performing a seismic survey operation. The wireline tool (106c) of FIG. 1.3 may, for example, have an explosive, radioactive, electrical, or acoustic energy source (144) that sends and/or receives electrical signals to the surrounding subterranean formations (102) and fluids therein.

The wireline tool (106c) may be operatively connected to, for example, the geophones (118) stored in the computer (122.1) of the seismic truck (106.1) of FIG. 1.1. The wireline tool (106c) may also provide data to the surface unit (134). The surface unit collects data generated during the wireline operation and produces data output (135) which may be stored or transmitted. The wireline tool (106c) may be positioned at various depths in the wellbore (136) to provide a survey or other information relating to the subterranean formation.

Sensors (S), such as gauges, may be positioned about the oilfield to collect data relating to various oilfield operations as described previously. As depicted, the sensor (S) is positioned in the wireline tool to measure downhole parameters that relate to, for example porosity, permeability, fluid composition and/or other parameters of the oilfield operation.

FIG. 1.4 depicts a production operation being performed by a production tool (106d) deployed from a production unit or Christmas tree (129) and into the completed wellbore (136) of FIG. 1.3 for drawing fluid from the downhole reservoirs into the surface facilities (142). Fluid flows from reservoir (104) through perforations in the casing (not depicted) and into the production tool (106d) in the wellbore (136) and to the surface facilities (142) via a gathering network (146).

Sensors (S), such as gauges, may be positioned about the oilfield to collect data relating to various oilfield operations as described previously. As depicted, the sensor (S) may be positioned in the production tool (106d) or associated equipment, such as the Christmas tree, gathering network, surface facilities and/or the production facility, to measure fluid parameters, such as fluid composition, flow rates, pressures, temperatures, and/or other parameters of the production operation.

An example of the seismic data output obtained in the field (100), for example the seismic data output (124) taken by seismic truck (106) or otherwise described with respect to FIGS. 1.1-1.4 above, is shown as a seismic trace (202) in FIG. 1.5. The seismic trace (202) may be used to provide data, such as a two-way response over a period of time.

While a simplified configuration is shown, it will be appreciated that the field (100) may cover a portion of land, sea and/or water locations. For example, the field (100) may be associated with oilfield operations and non-oilfield operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used.

As described above, shales are a major component in certain subterranean formation (e.g., sedimentary basins). FIG. 2.1 shows plate-shaped clay mineral particles (211) in a micro-mechanical model of shales in accordance with one or more embodiments. As a result of the increasing stress that develops during burial of geological elements caused by the geological movement during the forming of the subterranean formation, the plate-shaped clay mineral particles (211) in shales tend to align with planes oriented approximately perpendicular to the maximum stress direction. This partial alignment results in shale anisotropy. Because the low aspect ratio pores (214) between the clay particles (211) are expected to be more compliant than the clay particles themselves, additional compliance of interparticle regions (i.e., the region in between clay particles (211) including the the low aspect ratio pores (214)) is taken into account in the micro-mechanical model for describing elastic wave propagation through shales.

As described below in detail, the low aspect ratio pores (214) between clay particles (211) play an important role in determining the character of the anisotropy of shales and may be represented by a normal compliance $B_N$ and shear compliance $B_T$ that describe the deformation of the interparticle regions under an applied stress. The relations among the various anisotropy parameters for shales depend on the ratio $B_N/B_T$ of these low aspect ratio pores. Generally speaking, the anisotropy parameters $\epsilon$ and $\delta$ relate to a primary wave (P-wave) of the elastic waves (for example, used in seismic studies of the subterranean formation as described with respect to FIGS. 1.1-1.5 above) and are called the P-wave anisotropy parameters. The anisotropy parameter $\gamma$ relates to a secondary wave (S-wave) of the elastic waves and is called the S-wave anisotropy parameter. The ratio $B_N/B_T$ is characteristic of shale compositions and may be measured for a particular region in the subterranean formations using, but not limited to, core sample measurements, sonic logging techniques, or walkaway VSP (vertical array of seismic geophones) techniques. In addition, the S-wave anisotropy parameter $\gamma$ may be obtained based on the relationship of $\gamma$ with stiffness coefficients $C_{55}$ and $C_{66}$, which may be measured using sonic logging. As described below, the P-wave anisotropy parameters $\epsilon$ and $\delta$ may then be determined based on parameterized functions derived from the micro-mechanical model.

For perfectly aligned clay particles (e.g., (211)), $\gamma$ is solely a function of the shear compliance $B_T$, but $\epsilon$ and $\delta$ increase with increasing $B_N/B_T$. The presence of a fluid with non-zero bulk modulus in the regions between clay particles acts to decrease $B_N$ and may lead to significant reductions in $\epsilon$ and $\delta$ for sufficiently high fluid bulk modulus.

Many shales encountered in the subsurface may be described, to a good approximation, as being transversely isotropic with a vertical axis of rotational symmetry. A transversely isotropic medium has five independent elastic stiffnesses. Taking the $x_3$ axis to lie along the axis of rotational symmetry, the non-vanishing elastic stiffness coefficients are $c_{11}=c_{22}$, $c_{33}$, $c_{12}=c_{21}$, $c_{13}=c_{31}=c_{23}=c_{32}$, $c_{44}=c_{55}$ and $c_{66}=(c_{11}-c_{12})/2$ in the conventional two-index notation. Because an isotropic medium may be described by two elastic constants, a transversely isotropic medium has three anisotropy parameters. Using the above coefficients, the three anisotropy parameters $\epsilon$, $\gamma$, and $\delta$ may be defined as follows:

$$\varepsilon = \frac{c_{11} - c_{33}}{2c_{33}}, \tag{1}$$

$$\gamma = \frac{c_{66} - c_{55}}{2c_{55}}, \tag{2}$$

$$\delta = \frac{(c_{13} + c_{55})^2 - (c_{33} - c_{55})^2}{2c_{33}(c_{33} - c_{55})}. \tag{3}$$

The effect of interparticle regions on seismic anisotropy is described below. An elastic wave induces a jump discontinuity $[u_i]=u_i^+ - u_i^-$ in the ith component of the displacement vector $u_i$ from its value $u_i^-$ in the clay particle on the negative side $S^-$ (213) of the interparticle region (214) to its value $u_i^+$ in the clay particle on the positive side $S^+$ (212) of the region with the choice of normal n (i.e., $n^+$ (215) and $n^-$ (216)) to the particles (211) defining the positive side of the interparticle region (214). The displacement discontinuity may be related to the applied traction vector t with components $t_i$ by $[u_i]=B_{ij}t_j$. In the simplest case, $B_{ij}$ may be represented in terms of a normal compliance $B_N$ and shear compliance $B_T$, where $B_N$ gives the displacement discontinuity normal to the particle surfaces (212, 213) for unit normal traction, while $B_T$ gives the displacement discontinuity parallel to the particle surfaces (212, 213) for unit shear traction. This allows the elastic compliance tensor of a domain of parallel clay particles such as (211) to be written in the form, $$S_{ijkl}=S_{ijkl}^0+\Delta S_{ijkl} \tag{4}$$

where $S_{ijkl}^0$ is the elastic compliance tensor of the shale if the normal and shear compliance $B_N$ and $B_T$ were zero, i.e. if the clay particles (211) were welded together.

The excess compliance, $\Delta S_{ijkl}$, resulting from the normal and shear compliance of the low aspect ratio pores (214), can be expressed as $$\Delta S_{ijkl} = \frac{1}{4}(\delta_{ik}\alpha_{jl} + \delta_{il}\alpha_{jk} + \delta_{jk}\alpha_{il} + \delta_{jl}\alpha_{ik}) + \beta_{ijkl}. \tag{5}$$

Here $\alpha_{ij}$ is a second-rank tensor and $\beta_{ijkl}$ is a fourth-rank tensor, defined by as $$\alpha_{ij} = \frac{1}{V}\sum_r B_T^{(r)} n_i^{(r)} n_j^{(r)} A^{(r)}, \tag{6}$$

$$\beta_{ijkl} = \frac{1}{V}\sum_r (B_N^{(r)} - B_T^{(r)}) n_i^{(r)} n_j^{(r)} n_k^{(r)} n_l^{(r)} A^{(r)}. \tag{7}$$

In these equation, $B_N^{(r)}$ and $B_T^{(r)}$ are the normal and shear compliances of the rth interparticle region in volume V, $n_i^{(r)}$ is the ith component of the normal to the pore, and $A^{(r)}$ is the area of the pore. The elastic stiffness tensor is obtained by inverting the compliance tensor given by equations 4-7.

The assumption that the clay sheets (or particles such as (211)) are perfectly aligned, with normals parallel to the $x_3$ axis, implies that $n_1=n_2=0$, $n_3=1$ for all interparticle regions, and the only non-zero components of $\alpha_{ij}$ and $\beta_{ijkl}$ are $\alpha_{33}$ and $\beta_{3333}$, given by $$\alpha_{33} = \frac{1}{V}\sum_r B_T^{(r)} A^{(r)}, \tag{8}$$

$$\beta_{3333} = \frac{1}{V}\sum_r (B_N^{(r)} - B_T^{(r)}) A^{(r)}, \tag{9}$$

as follows from equations 6 and 7. The non-zero $\Delta S_{ij}$ are then, from equation 5, $$\Delta S_{44} = \Delta S_{55} = \alpha_{33} \tag{10}$$

$$\Delta S_{33} = \alpha_{33} + \beta_{3333} \tag{11}$$

In one or more embodiments, the anisotropy of the subterranean formation may be represented by normal compliance and shear compliance governed by equations (1-11) above that describe deformation of the low aspect ratio pores under an applied stress in the micro-mechanical model shown in FIG. 2.1.

In one or more embodiments, the equations (1-11) may be used in implementing various system modules in a system for estimating seismic anisotropy of shales as described below with respect to FIG. 2.2.

In one or more embodiments, a method for estimating seismic anisotropy of shales, such as described with respect to FIG. 3 below, may be devised based on the equations (1-11).

In one or more embodiments, parameterized functions, such as those depicted in FIGS. 4-6 below, on which the system modules of FIG. 2.2 and method elements of FIG. 3 are based, may be derived using the equations (1-11) and relationships between stiffness coefficient $c_{ij}$ and compliance tensor $s_{ijk}$ that are well known to one skilled in the art.

FIG. 2.2 shows a diagram of a system (200) in accordance with one or more embodiments. Specifically, FIG. 2.2 shows a diagram of a computing environment (225) in accordance with one or more embodiments. In one or more embodiments, one or more of the modules shown in FIG. 2.2 may be omitted, repeated, and/or substituted. Accordingly, embodiments of estimating horizontal stress from 3D anisotropy should not be considered limited to the specific arrangements of modules shown in FIG. 2.2.

In one or more embodiments, the computing environment (225) may include one or more computer systems (e.g., computer system A (230), computer system N (235), etc.) configured to perform oilfield operations such as drilling-related tasks. In one or more embodiments of the invention, the computer system(s) (e.g., 230, 235) may be web servers, embedded systems (e.g., a computer located in a downhole tool), desktop computers, laptop computers, personal digital assistants, any other similar type of computer system, or any combination thereof.

Specifically, in one or more embodiments, one or more of the computer systems (e.g., 230, 235) may include a compliance ratio calculator (240), a sonic measurement module (245), a parameterized function repository and solver (250), and a micro-mechanical model (255). In one or more embodiments, the aforementioned components (i.e., 240, 245, 250, 255) may be located in a single computer system (e.g., 230, 235), distributed across multiple computer systems (e.g., 230, 235), or any combination thereof. In one or more embodiments, each of the aforementioned components (i.e., 240, 245, 250, 255) may include one or more software modules, one or more hardware modules, or any combination thereof. Further, in one or more embodiments, the aforementioned components (i.e., 240, 245, 250, 255) may be configured to communicate with each other via function calls, application program interfaces (APIs), a network protocol (i.e., a wired or wireless network protocol), electronic circuitry, any other similar type of communication and/or communication protocol, or any combination thereof.

In one or more embodiments, the compliance ratio calculator (240) may be configured to determine a ratio of normal compliance over shear compliance of the subterranean formation. Determining a ratio of normal compliance over shear compliance of the subterranean formation, for example using a core sample is discussed below with respect to FIG. 3.

In one or more embodiments, the sonic measurement module (245) may be configured to measure a first formation parameter of the subterranean formation, for example an anisotropy parameter and/or a stiffness coefficient, using sonic measurement techniques such as those described with respect to FIGS. 1.1-1.5 above. Measuring the first formation parameter of the subterranean formation such as the S-wave anisotropy parameter is discussed below with respect to FIG. 3.

In one or more embodiments, the parameterized function repository and solver (250) may be configured to store parameterized functions such as those described with respect to FIGS. 4-6 below as well as to solve these parameterized functions based on the micro-mechanical model (255) using the estimated ratio of normal compliance over shear compliance from the compliance ratio calculator (240) and the measured first formation parameter from the sonic measurement module (245). Determining the second formation parameter, such as the P-wave anisotropy parameter, based on the micro-mechanical model is discussed below with respect to FIG. 3.

In one or more embodiments of the invention, the micro-mechanical model (255) may be configured to model the subterranean formation as a plurality of particles having low aspect ratio pores therebetween. In the micro-mechanical model, anisotropy of the subterranean formation is represented by normal compliance and shear compliance that describe deformation of the low aspect ratio pores under an applied stress. In one or more embodiments of the invention, the micro-mechanical model described with respect to FIG. 2.2 above may be used in the computing environment (225).

FIG. 3 shows a flowchart depicting a method for determining properties of subterranean formations in one or more embodiments of estimating seismic anisotropy of shales. The method may be practiced in the system (200) described with respect to FIG. 2.2 above and may use the shales micro-mechanical model described with respect to FIG. 2.1 above.

The subterranean formations may include a transversely isotropic region. In one or more embodiments, one or more of the elements shown in FIG. 3 may be omitted, repeated, and/or performed in a different order. Accordingly, embodiments of estimating seismic anisotropy of shales should not be considered limited to the specific arrangements of elements shown in FIG. 3.

In 301, a P-wave anisotropy parameter (e.g., $\epsilon$ or $\delta$) of a subterranean formation is represented as a parameterized function of the S-wave anisotropy parameter (e.g., $\gamma$) of the subterranean formation based on a micro-mechanical model. For example, the parameterized function may be those shown in FIGS. 4 and/or 5 below depicted as family curves each being a function corresponding to a value (as denoted adjacent to the corresponding curve) of the parameter for the parameterized function. Specifically, in FIGS. 4 and 5, the ratio of normal compliance over shear compliance ($B_N/B_T$) of the subterranean formation is used as the parameter.

In 302, the ratio of normal compliance over shear compliance ($B_N/B_T$) is determined at the subterranean formation (302). For example, core sample measurements, sonic logging measurements, or walkaway VSP techniques may be used to determine this ratio. With the value of the parameter known, the parameterized function may be used to determine the P-wave anisotropy parameter from the S-wave anisotropy parameter in the particular region under study. Alternatively, if both P-wave and S-wave anisotropy parameters are known, then the ratio of normal compliance over shear compliance ($B_N/B_T$) may be determined using FIGS. 4 and/or 5 below.

In 303, the S-wave anisotropy parameter of the subterranean formation is measured based on sonic measurement technique. For example, well logging may be performed in two or more wells with different deviation to obtain the S-wave anisotropy parameter (e.g., $\gamma$). In 304, the P-wave anisotropy parameter is determined using the parameterized function described in 301. For example, the P-wave anisotropy parameters (e.g., $\epsilon$ or $\delta$) may be looked up (using the family curves as described in 301 above) in FIGS. 4 and/or 5 using values of $B_N/B_T$ and $\gamma$. In 305, oilfield operations (e.g., estimating reservoir capacity and time to produce, developing well completion plan such as casing design and perforation, etc.) are performed based on the P-wave anisotropy parameter of the subterranean formation (305).

Figure 4:
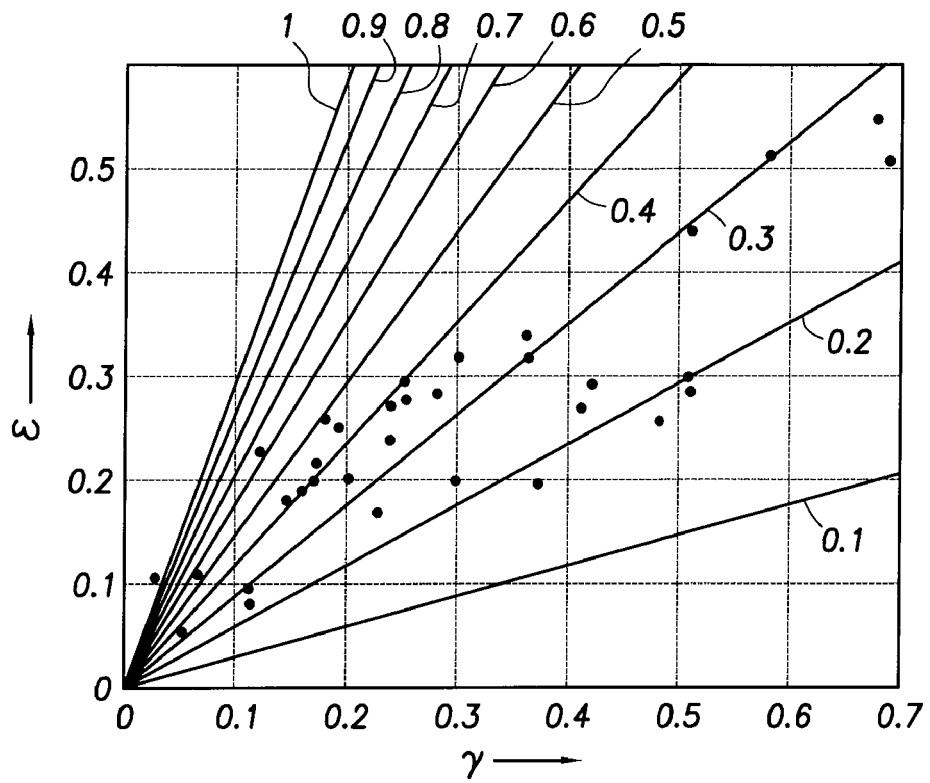
FIGS. 4-6 depicts example graphs illustrating relations between various anisotropy parameters for shales in accordance with one or more embodiments.
Figure 5:
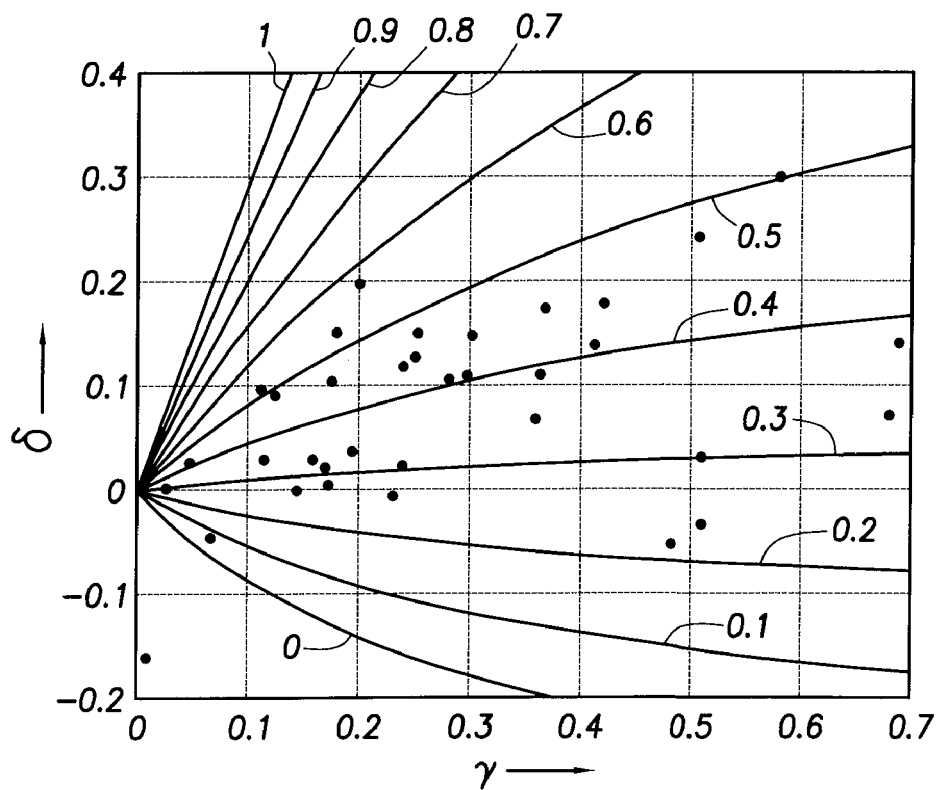
Figure 6:
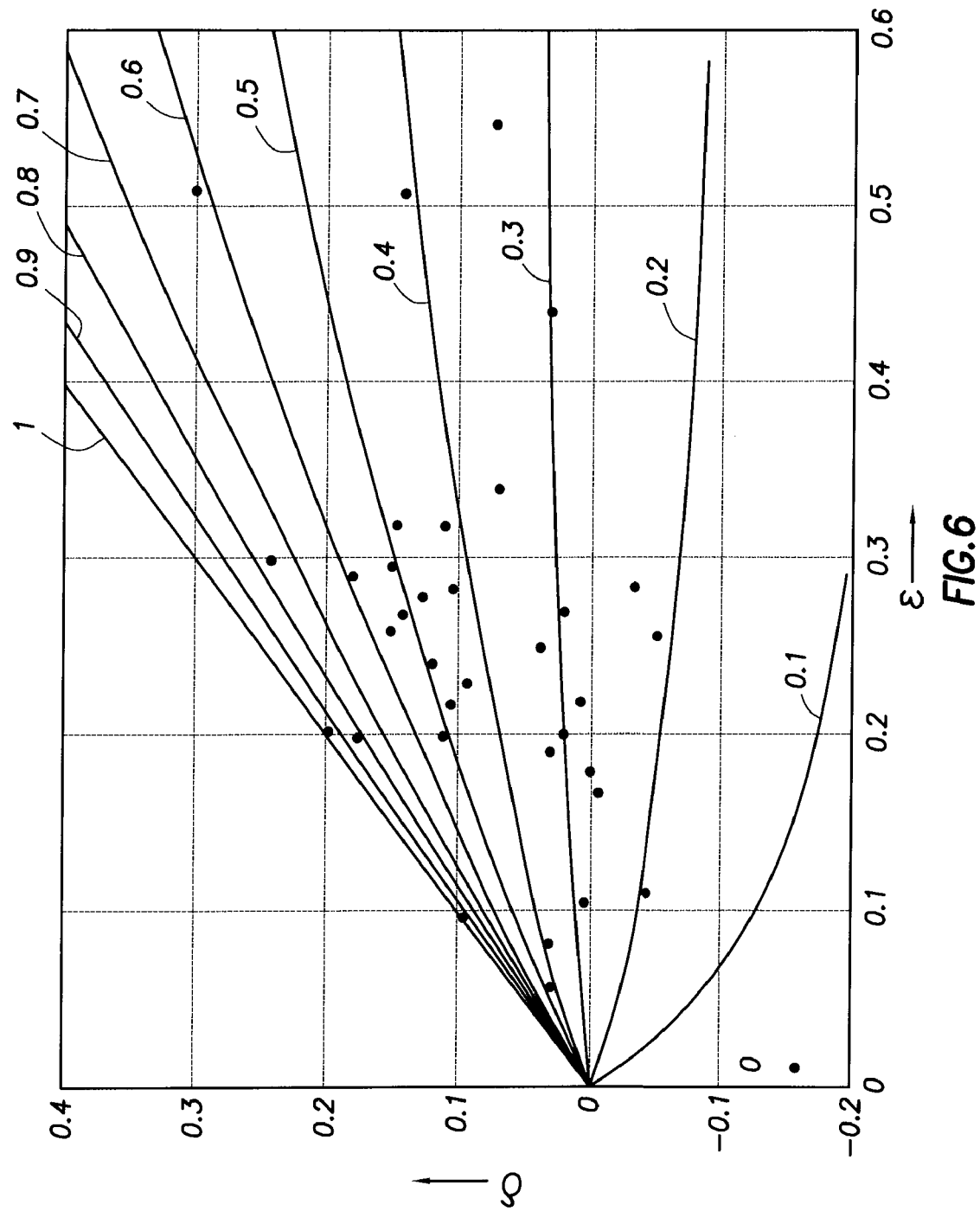

FIGS. 4-6 depict example graphs illustrating relations between various anisotropy parameters (e.g., $\epsilon$, $\delta$, and $\gamma$) for shales in accordance with one or more embodiments and are not intended to limit the scope of the claims. The relations between these various anisotropy parameters for shales are based on isotropic (Poisson's ratio $v=0.3154$) clay sheets that are perfectly aligned with normals parallel to the $x_3$ axis. The family of curves in FIGS. 4-6 are derived by applying equations 1-11 to substantially aligned clay particles with low aspect ratio pores (i.e., the micro-mechanical model of shales described with respect to FIG. 2.1 above).

FIG. 4 shows plots of $\epsilon$ versus $\gamma$ predicted by applying equations 1-11 to the micro-mechanical model as compared with the measurement values (denoted as individual dots) in the literature (e.g., Jones, L. E. A., and H. F. Wang, 1981, Ultrasonic velocities in Cretaceous shales from the Williston basin: Geophysics, 46, 288-297). These solid curves forms a parameterized function of $\epsilon$ versus $\gamma$ using $B_N/B_T$ as the parameter. As described above, such parameterized function of $\epsilon$ versus $\gamma$ may be derived using the governing equations (1-11) of the micro-mechanical model depicted in FIG. 2.1.

FIG. 5 shows plots of $\delta$ versus $\gamma$ predicted by applying equations 1-11 to the micro-mechanical model as compared with the measurement values (denoted as individual dots) in the literature (e.g., Jones, L. E. A., and H. F. Wang, 1981, Ultrasonic velocities in Cretaceous shales from the Williston basin: Geophysics, 46, 288-297). These solid curves form a parameterized function of $\delta$ versus $\gamma$ using $B_N/B_T$ as the parameter. As described above, such parameterized function of $\delta$ versus $\gamma$ may be derived using the governing equations (1-11) of the micro-mechanical model depicted in FIG. 2.1.

FIG. 6 shows plots of $\delta$ versus $\epsilon$ predicted by applying equations 1-11 to the micro-mechanical model as compared with the measurement values (denoted as individual dots) in the literature (e.g., Jones, L. E. A., and H. F. Wang, 1981, Ultrasonic velocities in Cretaceous shales from the Williston basin: Geophysics, 46, 288-297). These solid curves form a parameterized function of $\delta$ versus $\epsilon$ using $B_N/B_T$ as the parameter. As described above, such parameterized function of $\delta$ versus $\epsilon$ may be derived using the governing equations (1-11) of the micro-mechanical model depicted in FIG. 2.1.

Based on the assumption of perfectly aligned clay particles, $\gamma$ depends on the properties of the interparticle regions only through the shear compliance $B_T$. By contrast, $\epsilon$ and $\delta$ are seen in FIGS. 4 and 5 to increase with increasing values of $B_N/B_T$.

Using the parameterized functions of $\epsilon$ versus $\gamma$ and/or $\delta$ versus $\gamma$ above, P-wave anisotropy parameters $\epsilon$ and/or $\delta$ may be determined based on S-wave anisotropy parameter $\gamma$ measured using sonic measurement (e.g., using the dipole shear and Stoneley wave velocities) and $B_N/B_T$ measured using core sample measurements. Alternatively, if P-wave anisotropy parameters $\epsilon$ and/or $\delta$ as well as S-wave anisotropy parameter $\gamma$ are known, $B_N/B_T$ may be determined, which may indicate fluid content (e.g., oil, gas, brine, etc.) in the interparticle space of the shales. As shown in FIGS. 4-5, negative values of $\delta$ may occur if $B_N/B_T$ is sufficiently small. As a result of the fluid (with non-zero bulk modulus) in the interparticle space, the normal compliance $B_N$ is expected to be less than the shear compliance $B_T$. Drying of a core sample of shale in the laboratory would be expected to lead to an increase in $B_N/B_T$ and may result in an overestimation of $\epsilon$ and $\delta$ relative to $\gamma$. Therefore, fully saturated shale samples are measured to correctly characterize the in-situ anisotropy of the shale.

It will be understood from the foregoing description that various modifications and changes may be made in the preferred and alternative embodiments of estimating seismic anisotropy of shales without departing from its true spirit. For example, the example shown above describes a method to determine one or more P-wave anisotropy parameters from the measured/estimated S-wave anisotropy parameter based on the micro-mechanical model using a parameterized function. One skilled in the art will appreciate with the benefit of this disclosure that the S-wave anisotropy parameter may also be determined from a measured/estimated P-wave anisotropy parameter using a similar approach.

Furthermore, wide-offset P-wave seismic data may be used to determine an anisotropy parameter $\eta$ from non-hyperbolic moveout (the departure of reflection travel time vs source/receiver offset from a hyperbola). As is known to those skilled in the art, $\eta$ is an important anisotropy parameter required for anisotropic prestack time migration, and is defined by $$\eta = \frac{\varepsilon - \delta}{1 + 2\delta}.$$

Thus, an estimate of η from non-hyperbolic velocity analysis may allow an estimate of γ using the methods described above.

Furthermore, an estimate of the anisotropy parameter δ may be obtained by comparing the small-offset moveout velocity of PP reflections with the vertical P-wave velocity using the equation. Thus, an estimate of δ by comparing the small-offset moveout velocity of PP reflections with the vertical P-wave velocity may allow an estimate of γ using the methods described above.

Furthermore, an estimate of the anisotropy parameter ε may be obtained by comparing the vertical P-wave velocity with the horizontal P-wave velocity, as may be measured from a crosswell experiment with a P-wave source and P-wave receiver at a similar depth in two nearby wells. Thus, an estimate of ε by comparing the vertical and horizontal P-wave velocity may allow an estimate of γ using the methods described above.

Furthermore, additional anisotropy parameters, other than those described in the example above may also be determined using this approach.

Still further, it is known that stiffness coefficients in a stiffness matrix characterizing the transversely isotropic region may be determined from the P-wave anisotropy parameters, the S-wave anisotropy parameter, a P-wave velocity, and a S-wave velocity. Therefore, any of the stiffness coefficients and/or anisotropy parameters may be determined from other measured/estimated stiffness coefficients and/or anisotropy parameters using the method described above.

Figure 7:
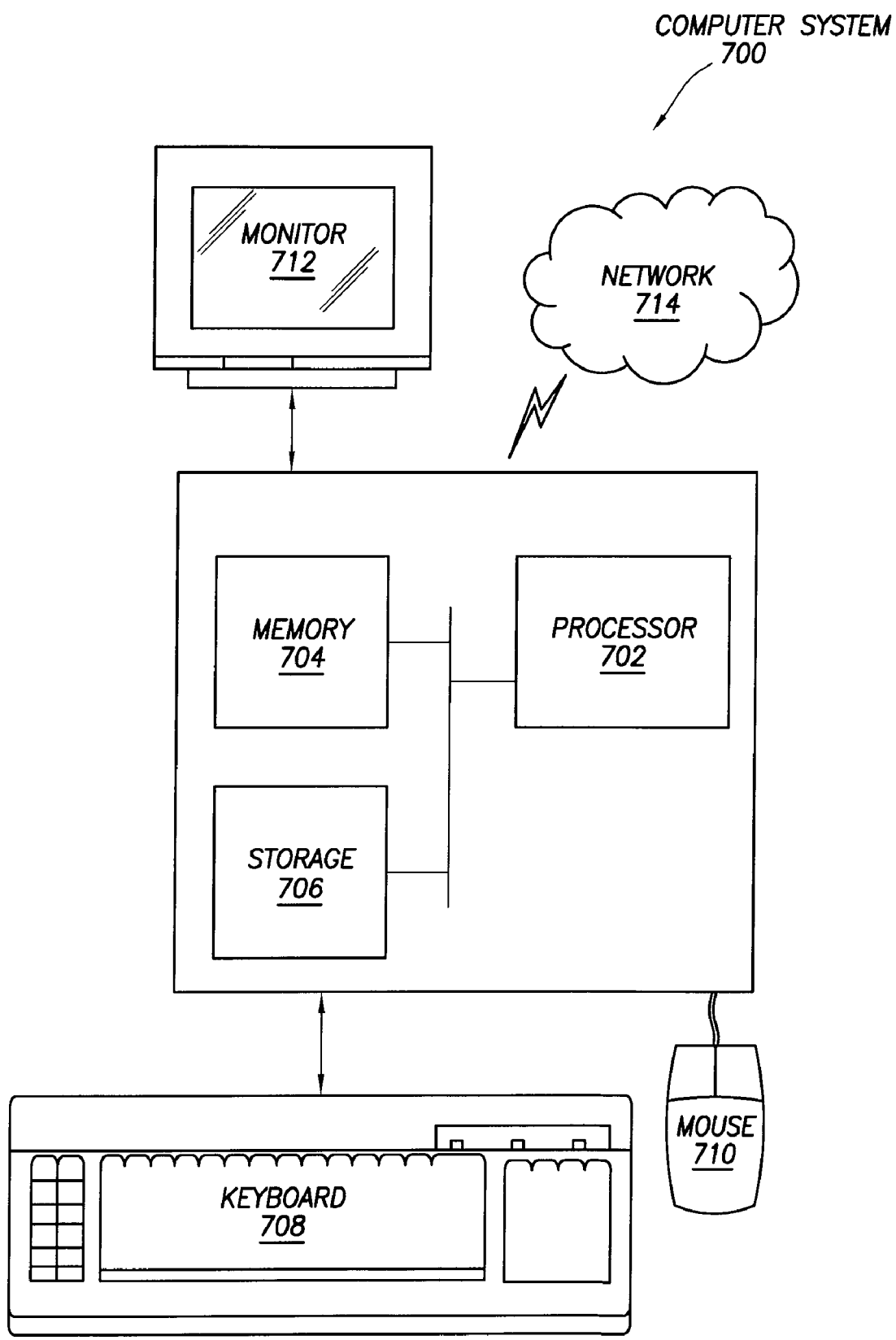
FIG. 7 depicts a computer system in accordance with one or more embodiments.

Embodiments of estimating seismic anisotropy of shales may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer (700) may also include input means, such as a keyboard (708), a mouse (710), or a microphone (not shown). Further, the computer (700) may include output means, such as a monitor (712) (e.g., a liquid crystal display (LCD), a plasma display, or cathode ray tube (CRT) monitor). The computer system (700) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of estimating seismic anisotropy of shales.

Further, those skilled in the art will appreciate that one or more elements of the aforementioned computer system (700) may be located at a remote location and connected to the other elements over a network. Further, embodiments of estimating seismic anisotropy of shales may be implemented on a distributed system having a plurality of nodes, where each portion of estimating seismic anisotropy of shales may be located on a different node within the distributed system. In one embodiment, the node corresponds to a computer system. Alternatively, the node may correspond to a processor with associated physical memory. The node may alternatively correspond to a processor with shared memory and/or resources.

Further, software instructions for performing embodiments of estimating seismic anisotropy of shales may be stored on a computer readable medium such as a compact disc (CD), a diskette, a tape, or any other computer readable storage device.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

While the estimating seismic anisotropy of shales has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method utilizing at least one computing system for determining properties of a subterranean formation, comprising:
   obtaining a micro-mechanical model for modeling the subterranean formation as a plurality of particles having low aspect ratio pores therebetween, wherein anisotropy of the subterranean formation is represented by normal compliance and shear compliance that describe deformation of the low aspect ratio pores under an applied stress;
   determining a ratio of normal compliance over shear compliance of the subterranean formation to obtain an estimated ratio of normal compliance over shear compliance;
   measuring a first formation parameter of the subterranean formation to obtain a measured first formation parameter based on a sonic measurement technique;
   with at least one processor of the computing system, determining a second formation parameter based on the micro-mechanical model using the estimated ratio of normal compliance over shear compliance and the measured first formation parameter; and
   storing the second formation parameter of the subterranean formation,
   wherein the first formation parameter and the second formation parameter comprises at least one selected from a group consisting of an anisotropy parameter and a stiffness coefficient of the subterranean formation.

2. The method of claim 1, wherein the micro-mechanical model represents the second formation parameter as a parameterized function of the first formation parameter, wherein a parameter of the parameterized function comprises the ratio of normal compliance over shear compliance.

3. The method of claim 1, wherein the subterranean formation comprises a transversely isotropic region.

4. The method of claim 1, wherein the subterranean formation comprises shale.

5. The method of claim 1, wherein the plurality of particles comprises a plurality of substantially aligned clay particles.

6. The method of claim 1, wherein the estimated ratio of normal compliance over shear compliance of the subterranean formation is determined using at least one selected from a group consisting of a core sample, sonic logging data, and a walkaway vertical array of seismic geophones.

7. The method of claim 1, wherein the first formation parameter comprises a primary wave ("P-wave") anisotropy parameter 8, wherein the second formation parameter comprises a secondary wave ("S-wave") anisotropy parameter $\gamma$, and wherein the measured first formation parameter of the subterranean formation is measured by comparing vertical and horizontal P-wave velocities measured from a crosswell experiment with a P-wave source and a P-wave receiver at a substantially same depth in two nearby wells.

8. The method of claim 1, wherein the first formation parameter comprises a secondary wave ("S-wave") anisotropy parameter, wherein the second formation parameter comprises a primary wave ("P-wave") anisotropy parameter, and wherein the measured first formation parameter of the subterranean formation is measured as a well log.

9. The method of claim 1, wherein the first formation parameter comprises a anisotropy parameter 11, wherein $\eta=(\epsilon-\delta)/(1+2\delta)$, wherein $\epsilon$ and $\delta$ are primary wave ("P-wave") anisotropy parameters, wherein the second formation parameter comprises a secondary wave ("S-wave") anisotropy parameter $\gamma$, and wherein the measured first formation parameter of the subterranean formation is measured using non-hyperbolic velocity analysis.

10. The method of claim 1, wherein the first formation parameter comprises a primary wave ("P-wave") anisotropy parameter $\delta$, wherein the second formation parameter comprises a secondary wave ("S-wave") anisotropy parameter $\gamma$, and wherein the measured first formation parameter of the subterranean formation is measured by comparing a small-offset moveout velocity of PP reflections with a vertical P-wave velocity.

11. The method of claim 1, wherein the first and second formation parameters comprise at least one selected from a group consisting of a primary wave ("P-wave") anisotropy parameter, a secondary wave ("S-wave") anisotropy parameter, a P-wave velocity, a S-wave velocity, and a stiffness coefficient in a stiffness matrix characterizing the subterranean formation.

12. A non-transitory computer readable medium having stored thereon executable instructions configured to be executed by a processor to determine properties of a subterranean formation such that, when executed, the executable instructions perform the steps comprising:
determining a ratio of normal compliance over shear compliance of a subterranean formation to obtain an estimated ratio of normal compliance over shear compliance;
measuring a secondary wave ("S-wave") anisotropy parameter of the subterranean formation to obtain a measured S-wave anisotropy parameter based on a sonic measurement technique;
determining a primary wave ("P-wave") anisotropy parameter by solving a parameterized function based on a micro-mechanical model using at least the estimated ratio of normal compliance over shear compliance and the measured S-wave anisotropy parameter, wherein the micro-mechanical model represents the subterranean formation as a plurality of particles having low aspect ratio pores therebetween; and
displaying the P-wave anisotropy parameter of the subterranean formation.

13. The non-transitory computer readable medium of claim 12, wherein the subterranean formation comprises a transversely isotropic region, wherein the estimated ratio of normal compliance over shear compliance of the subterranean formation is determined using at least one selected from a group consisting of a core sample, sonic logging data, and a walkaway vertical array of seismic geophones, and wherein the measured S-wave anisotropy parameter of the subterranean formation is measured as a well log.

14. The non-transitory computer readable medium of claim 12, wherein the micro-mechanical model models the subterranean formation as a plurality of particles having low aspect ratio pores therebetween, wherein anisotropy of the subterranean formation is represented by normal compliance and shear compliance that describe deformation of the low aspect ratio pores under an applied stress.

15. The non-transitory computer readable medium of claim 12, wherein the subterranean formation comprises shale.

16. The non-transitory computer readable medium of claim 12, wherein the plurality of particles comprises a plurality of substantially aligned clay particles.

17. The non-transitory computer readable medium of 12, wherein the parameterized function represents the P-wave anisotropy parameter as a parameterized function of the S-wave anisotropy parameter based on the micro-mechanical model, wherein a parameter of the parameterized function comprises the ratio of normal compliance over shear compliance, and wherein the P-wave anisotropy parameter, the S-wave anisotropy parameter, the normal compliance, and the shear compliance relate to the subterranean formation.

18. A system for determining properties of a subterranean formation, comprising:
a sonic measurement tool;
a processor; and
a memory storing executable instructions, the executable instructions configured to be executed by the processor to obtain a micro-mechanical model for modeling the subterranean formation as a plurality of particles having low aspect ratio pores therebetween, wherein anisotropy of the subterranean formation is represented by normal compliance and shear compliance that describe deformation of the low aspect ratio pores under an applied stress; measure first and second formation parameters of the subterranean formation to obtain measured first and second formation parameters, based on a sonic measurement technique; determine a ratio of normal compliance over shear compliance of the subterranean formation based on the measured first and second formation parameters using the micro-mechanical model; and store the ratio of normal compliance over shear compliance of the subterranean formation in the repository, wherein the first formation parameter and the second formation parameter comprises at least one selected from a group consisting of a anisotropy parameter and a stiffness coefficient of the subterranean formation, wherein the subterranean formation comprises shales, wherein the plurality of particles comprises a plurality of substantially aligned clay particles.

19. The system of claim 18, wherein the subterranean formation comprises a transversely isotropic region, and wherein the micro-mechanical model represents the first formation parameter as a parameterized function of the second formation parameter, wherein a parameter of the parameterized function comprises the ratio of normal compliance over shear compliance.

20. The system of claim 18, wherein the micro-mechanical model models the subterranean formation as a plurality of particles having low aspect ratio pores therebetween, wherein anisotropy of the subterranean formation is represented by normal compliance and shear compliance that describe deformation of the low aspect ratio pores under an applied stress.

* * * * *